US006960410B2

(12) United States Patent
Kim et al.

(10) Patent No.: US 6,960,410 B2
(45) Date of Patent: Nov. 1, 2005

(54) ELECTROLYTE COMPRISING NON-IONIC SURFACTANT AND LITHIUM ION BATTERY USING THE SAME

(75) Inventors: Hyeong-Jin Kim, Taejeon (KR); Yeon-Hee Lee, Taejeon (KR); Bong-Youl Chung, Taejeon (KR); Young-Keun Kim, Taejeon (KR)

(73) Assignee: LG Chem, Ltd. (KR)

( * ) Notice: Subject to any disclaimer, the term of this patent is extended or adjusted under 35 U.S.C. 154(b) by 214 days.

(21) Appl. No.: 10/380,141

(22) PCT Filed: May 8, 2002

(86) PCT No.: PCT/KR02/00853

§ 371 (c)(1), (2), (4) Date: Mar. 10, 2003

(87) PCT Pub. No.: WO02/091497

PCT Pub. Date: Nov. 14, 2002

(65) Prior Publication Data

US 2003/0170547 A1 Sep. 11, 2003

(30) Foreign Application Priority Data

May 9, 2001 (KR) .................................... 2001/0025312

(51) Int. Cl.[7] .......................... H01M 10/40; H01M 4/48

(52) U.S. Cl. .................... 429/324; 429/332; 429/231.1; 429/231.8

(58) Field of Search ................................ 429/324, 332, 429/231.8, 231.1

(56) References Cited

U.S. PATENT DOCUMENTS

| | | | | |
|---|---|---|---|---|
| 5,521,027 A | | 5/1996 | Okuno et al. | 429/194 |
| 5,525,443 A | | 6/1996 | Okuno et al. | 429/194 |
| 6,436,582 B1 | * | 8/2002 | Hamamoto et al. | 429/340 |
| 2002/0127475 A1 | * | 9/2002 | Marchionni et al. | 429/324 |

FOREIGN PATENT DOCUMENTS

| | | |
|---|---|---|
| JP | 06/151249 | 5/1994 |
| JP | 06-196200 | 7/1994 |
| JP | 8-7923 | 1/1996 |
| JP | 8-306386 | 11/1996 |
| JP | 2000-173651 | 6/2000 |
| JP | 2001-43900 | 2/2001 |
| JP | 2001-60464 | 3/2001 |

* cited by examiner

*Primary Examiner*—John S. Maples
(74) *Attorney, Agent, or Firm*—Cantor Colburn LLP

(57) ABSTRACT

The present invention relates to an electrolyte comprising a non-ionic surfactant and a lithium ion battery using the same, and more particularly, to a non-aqueous electrolyte for a lithium ion battery comprising a fluorine-based non-ionic surfactant. The lithium ion battery prepared according to the present invention uses an electrolyte comprising a fluorine-based non-ionic surfactant that is substituted with various functional groups at the end group as represented by a fluorine-based non-ionic surfactant represented by a Formula:

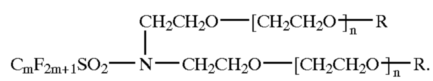

wherein, R is hydrogen, an acetyl group, a methyl group or a benzoyl goup; and m and n are integers from 2 to 20. The surfactant can improve the interfacial property between an electrolyte and electrodes and impedance properties, and exhibits a high capacity and excellent charge/discharge properties.

9 Claims, 2 Drawing Sheets

ELECTROLYTE COMPRISING NON-IONIC SURFACTANT AND LITHIUM ION BATTERY USING THE SAME

BACKGROUND OF THE INVENTION (a) Field of the Invention

The present invention relates to an electrolyte comprising a non-ionic surfactant and to a lithium ion battery using the same, and more particularly, to a non-aqueous electrolyte for a lithium ion battery comprising a fluorine-based non-ionic surfactant.

(b) Description of the Related Art

Ever since the commercialization of lithium ion liquid secondary batteries by Sony Co., the lithium ion liquid secondary battery has been used increasingly in portable computers, cellular phones, etc., instead of the prior art lithium ion secondary batteries as a result of its high energy density. The lithium ion liquid secondary battery comprises an anode including carbonaceous material as an anode active material and a cathode including metal oxide of lithium cobalt oxide ($LiCoO_2$), etc., as a cathode active material, and is prepared by intercalating a porous polyolefin-based separator between the anode and the cathode, then by injecting a non-aqueous electrolyte having a lithium salt of lithium hexafluorophosphate ($LiPF_6$), etc. When the battery charges, the lithium ions of the cathode active material are released and then inserted into the carbon layer of the anode. When the battery discharges, the opposite occurs with the lithium ions of a carbon layer of an anode being released and then inserted into the cathode active material.

The non-aqueous electrolyte plays a mediating role moving the lithium ions between the anode and the cathode. The electrolyte should be stable within the scope of the operation voltage of the battery, and be able to transfer the ions sufficiently at a fast velocity. As an electrolyte, U.S. Pat. Nos. 5,521,027 and 5,525,443 discloses an admixture electrolyte of a linear carbonate and cyclic carbonate. The cyclic carbonate has a large polarity and thus is sufficiently capable of dissociating lithium, but has high viscosity. Therefore, in these patents, mixing linear carbonate with a low polarity and a low viscosity reduces the viscosity of the electrolyte comprising the cyclic carbonate. The different linear carbonates include dimethyl carbonate (DMC), diethyl carbonate (DEC), ethyl methyl carbonate (EMC), etc. The different cyclic carbonates include ethylene carbonate (EC), propylene carbonate (PC), vinylene carbonate (VC), butylene carbonate (BC), etc. The use of cyclic carbonates is necessary when it is desired to obtain a light capacity, good temperature properties, and a safe battery configuration, and particularly, when using electrolytes having a high viscosity such as EC, PC, etc.

The non-aqueous electrolyte decreases operational efficiency because it is slowly penetrated into the active material of electrodes, and thus the performance of the battery deteriorates by increasing an impedance thereof because a sufficient capacity of the battery cannot be utilized. Accordingly, in order to improve an interfacial property between the non-aqueous electrolyte and electrodes, Japanese Patent Publication Hei 8-306386 discloses a method of adding an anionic surfactant to an electrolyte and Japanese Patent Publication Hei 9-30651 discloses a method of adding an anionic surfactant directly to the electrode slurry. However, satisfactory results have not been obtained with these two methods. The surfactant that is contained in an electrolyte should not affect the other properties of a battery, should be stable in the operation voltage range of a battery and increase an interfacial activity between electrodes and an electrolyte.

SUMMARY OF THE INVENTION

The present invention was made in consideration of the problems of the prior art, and it is an object of the present invention to provide an electrolyte additive comprising a fluorine-based non-ionic surfactant, which can improve impedance properties of a battery by improving an interfacial property between an electrolyte and electrodes, and which can be used in preparing a lithium ion secondary battery having a high capacity and high efficiency.

It is another object of the present invention to provide a lithium ion battery comprising the electrolyte additive.

The fluorine-based non-ionic surfactant is represented by Formula 1 as follows:

Formula 1

$$\begin{array}{l} \qquad\qquad\qquad\quad CH_2CH_2O - [CH_2CH_2O]_n - R \\ \qquad\qquad\qquad\quad | \\ C_mF_{2m+1}SO_2 - N - CH_2CH_2O - [CH_2CH_2O]_n - R \end{array}$$

wherein, R is a hydrogen, an acetyl group, a methyl group or a benzoyl group; and m and n are integers from 2 to 20.

The surfactant can be used in the preparation of a lithium ion battery having high capacity and high efficiency. The lithium ion battery comprises: an anode active material; a cathode active material; a porous separator; and an electrolyte. The electrolyte comprises a lithium salt; an electrolyte compound; and the fluorine-based non-ionic surfactant represented by Formula 1 above.

BRIEF DESCRIPTION OF THE DRAWINGS

Referring now to the figures, which are exemplary embodiments, and wherein the like elements are numbered alike.

DETAILED DESCRIPTION OF THE PREFERRED EMBODIMENTS

Figure 1:
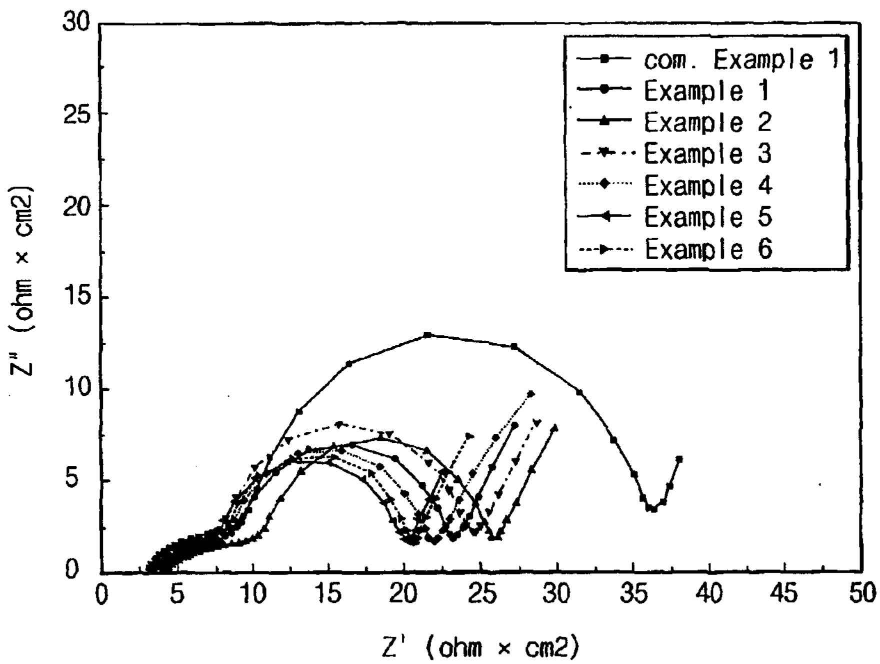
FIG. 1 is a graph comparing impedance properties of lithium ion batteries prepared according to Examples 19–24 and of batteries prepared according to Comparative Example 2.

The present invention will now be explained in more detail.

The present invention relates to an electrolyte comprising a fluorine-based non-ionic surfactant represented by Formula 1 below:

Formula 1

$$\begin{array}{l} \qquad\qquad\qquad\quad CH_2CH_2O - [CH_2CH_2O]_n - R \\ \qquad\qquad\qquad\quad | \\ C_mF_{2m+1}SO_2 - N - CH_2CH_2O - [CH_2CH_2O]_n - R \end{array}$$

wherein, R is a hydrogen, an acetyl group, a methyl group or a benzoyl group; and m and n are integers from 2 to 20. In addition, the present invention provides a lithium ion secondary battery comprising an anode including graphitized carbon, a cathode including lithium-containing transition metal oxide, a porous separator and an electrolyte containing a fluorine-based non-ionic surfactant represented by Formula 1 above, in which the secondary battery has a large capacity and improved impedance properties.

Generally, EC, which is a cyclic carbonate used for a battery employing a graphitized carbon anode, has a high solubility for lithium salts and a high ion conductivity. However, when EC is used in excess, it rapidly decreases low temperature properties of an electrolyte because it has a melting point that is higher than room temperature. In order to solve this problem, 2-ingredient electrolytes containing linear carbonates having a low melting point and a low viscosity have generally been used. Nevertheless, such an electrolyte increases impedance to deteriorate battery performance during high-speed charging/discharging because it takes a long time for the electrolyte to penetrate into an active material of electrodes when injected into a battery, and a sufficient capacity cannot be obtained from the active material even with a long charge time.

The present invention can decrease an impedance of the whole cell by adding a fluorine-based non-ionic surfactant represented by Formula 1 to an electrolyte such that the easy penetration of an electrolyte into electrodes occurs to decrease interfacial resistance. The surfactant added should not affect the other properties of the battery and should be stable in the operation voltage range of the battery. The surfactant, represented by Formula 1 used in the present invention, is a high molecular compound substituted at each hydroxy group of its end group with acetyl, methyl or a benzoyl group by a common organic synthetic process in order to eliminate reactivity with an electrolyte. For example, MEGAFAC F-142D (n=10), F-144D (n=20) and F-142P (n=10, high purity) purchased from DIANIPPON INK & CHEMICALS Company are substituted at each hydroxy group of each end group with acetyl, methyl and benzoyl groups respectively to be used in the present invention.

The fluorine-based non-ionic surfactant represented by Formula 1 has a hydrophobic group using a fluorocarbon ring instead of a hydrocarbon ring, which is resistant to heat and chemicals since it has strong carbon-fluorine bonds, and particularly which does not affect the other properties of the battery since it remains stable during charging/discharging of a battery. In addition, one end of the surfactant that is covered with fluorocarbon has a much higher interfacial tension at a surface of a solid electrode to improve the interfacial properties between a solid electrode and an organic solvent.

Meanwhile, the present invention prepares a lithium ion secondary battery having a large capacity and improved impedance properties using an electrolyte comprising a fluorine-based non-ionic surfactant represented by Formula 1 above.

The lithium ion battery of the present invention comprises a graphitized carbon that can reversibly store and release lithium as an anode active material; lithium-containing transition metal oxides that can reversibly store and release lithium as a cathode active material; a porous separator; and a non-aqueous electrolyte comprising a lithium salt, an electrolyte compound and a fluorine-based non-ionic surfactant represented by Formula 1 above.

The graphitized carbon has preferably an interplanar spacing of d002 of 0.338 nanometers (nm) or less as measured by X-ray diffraction of carbonaceous material, and has a specific surface area of 10 squared meters per gram ($m^2/g$) or less as measured by the Brunauer-Emmett-Teller (BET) method.

The lithium-containing transition metal oxide is preferably selected from the group consisting of $LiCoO_2$, lithium nickelate ($LiNiO_2$), lithium manganese oxide ($LiMn_2O_4$), and $LiNi_{1-x}Co_xO_2$ (0<x<1).

The lithium salt is preferably at least one selected from the group consisting of lithium perchlorate ($LiClO_4$), lithium trifluoromethane sulfonate ($LiCF_3SO_3$), $LiPF_6$, lithium tetrafluoroborate ($LiBF_4$), lithium hexafluoroarsentate, ($LiAsF_6$), and lithium (bis) trifluoro methane sulfonimide ($LiN(CF_3SO_2)_2$).

The electrolyte compound is preferably selected from the group consisting of ethylene carbonate, propylene carbonate, butylene carbonate, vinylene carbonate, diethyl carbonate, dimethyl carbonate, ethyl methyl carbonate, gamma-butyrolactone, sulfolane, methyl acetate, and methyl propionate.

Futhermore, the contents of the fluorine-based non-ionic surfactant represented by Formula 1 is preferably 0.01 to 1weight percent (wt %) of the electrolyte.

The battery using the components as mentioned above uses, for example, an anode comprising carbon active material and a polyvinylidene difluoride binder, and a cathode comprising lithium transition metal oxide active material, conductive carbon and a polyvinylidene difluoride binder to realize a lithium ion battery.

As mentioned above, the present invention prepares a lithium ion battery using a fluorine-based ethylene oxide surfactant represented by Formula 1 above, thereby enabling the sufficient penetration of an electrolyte into the active material of a battery to decrease the impedance in the battery. This increases the capacity of the active material and charge/discharge efficiency.

Hereinafter, the present invention is described more in detail through the examples. However, the following examples are presented to enable better understanding of the present invention, and the present invention is not limited to the following examples.

EXAMPLES

Example 1

Synthesis of a Fluorine-based Ethylene Oxide Resin Surfactant F-142d-Ac Substituted with Acetate at the End F-142d (average n=10, mean molecular weight=1379, 2.50 grams (g)) and triethylamine (0.44 g) were dissolved in dichloromethane (25 milliliters (mL)), and acetyl chloride (0.57 g) was slowly added thereto at 0° C. under nitrogen atmosphere. After elevating the temperature of the mixture to room temperature, the mixture was stirred for 15 hours. After the reaction was completed, the produced solids were filtered and the solvent was distilled under reduced pressure. Diethyl ether (25 mL) was added thereto to further produce solids not produced in dichloromethane. The solids were filtered and removed, and diethyl ether was distilled under reduced pressure and removed to obtain a liquid product. An acetyl group of the product was identified by the peak near 4.2 parts per million (ppm) using a Bruker 300 megahertz (MHz) nuclear magnetic resonance NMR.

Example 2

Synthesis of a Fluorine-based Ethylene Oxide Resin Surfactant F-144d-Ac Substituted with Acetyl at the End F-144d (average n=20, mean molecular weight=2260, 2.50 g) and triethylamine (0.27 g) were dissolved in dichloromethane (25 mL) and acetyl chloride (0.57 g) was slowly added thereto at 0° C. under nitrogen atmosphere. After elevating the temperature of the mixture to room temperature, the mixture was stirred for 15 hours. After the reaction was completed, the produced solids were filtered and the solvent was distilled under reduced pressure. Diethyl ether (25 mL) was added thereto to further produce solids not produced in dichloromethane. The solids were filtered and removed, and diethyl ether was distilled under reduced pressure and removed to obtain a liquid product.

Example 3

Synthesis of a Fluorine-based Ethylene Oxide Resin Surfactant F-142d-Me Substituted with a Methyl Group at the End Potassium hydroxide powder (85%, 0.72 g) was slowly added to a solution of F-142d (average n=10, mean molecular weight=1379, 2.5 g) and 1,4-dioxane (5 mL) while stirring in a bath at 65° C. Dimethyl sulfate (0.35 mL) was added thereto at a rate of 3 drops per 5 minutes. The mixture was further stirred in a bath at 65° C. for 3 hours.

After the reaction was completed, the produced solids were filtered and the solvent was distilled under reduced pressure. Layers were separated using dichloromethane (25 mL) and water (25 mL), the organic layer was taken and dried using anhydrous $MgSO_4$, and the organic solvent was distilled under reduced pressure to obtain a liquid product. A methyl group of the product was identified by the peak near 3.38 ppm using a Bruker 309 MHz NMR.

Example 4

Synthesis of a Fluorine-based Ethylene Oxide Resin Surfactant F-144d-Me Substituted with a Methyl Group at the End Potassium hydroxide powder (85%, 0.44 g) was slowly added to a solution of F-144d (average n=20, mean molecular weight=2260, 2.5 g) and 1,4-dioxane (5 mL) while stirring in a bath at 65° C. Dimethyl sulfate (0.21 mL) was added thereto at a rate of 3 drops per 5 minutes. The mixture was further stirred in a bath at 65° C. for 3 hours.

After the reaction was completed, the produced solids were filtered and the solvent was distilled under reduced pressure. Layers were separated using dichloromethane (25 mL) and water (25 mL), the organic layer was taken and dried using anhydrous $MgSO_4$, and the organic solvent was distilled under reduced pressure to obtain a liquid product.

Example 5

Synthesis of a Fluorine-based Ethylene Oxide Resin Surfactant F-142d-Bz Substituted with a Benzoyl Group at the End F-142d (average n=10, mean molecular weight=1379, 2.5 g) and triethylamine (0.44 g) were dissolved in dichloromethane (25 mL) and benzoyl chloride (0.84 mL) was slowly added thereto at 0° C. under nitrogen atmosphere. After elevating the temperature of the mixture to room temperature, the mixture was stirred for 15 hours.

After the reaction was completed, the produced solids were filtered and the solvent was distilled under reduced pressure. Diethyl ether (25 mL) was added thereto and triethylamine (0.44 g) was further added, and the mixture was stirred for 30 minutes. Further produced solids not produced in dichloromethane and benzoyl chloride-trimethyamine-salt were filtered and removed, then diethyl ether was distilled under reduced pressure and removed to obtain a liquid product. A benzoyl group of the product was identified by the peak near 7.46, 7.57, and 8.08 ppm using a Bruker 300 MHz NMR.

Example 6

Synthesis of a Fluorine-based Ethylene Oxide Resin Surfactant F-144d-Bz Substituted with a Benzoyl Group at the End F-144d (average n=20, mean molecular weight=2260, 2.5 g) and triethylamine (0.27 g) were dissolved in dichloromethane (25 mL) and benzoyl chloride (0.51 mL) was slowly added thereto at 0° C. under nitrogen atmosphere. After elevating to the temperature of the mixture to room temperature, the mixture was stirred for 15 hours.

After the reaction was completed, the produced solids were filtered and the solvent was distilled under reduced pressure. Diethyl ether (25 mL) was added thereto and triethylamine (0.44 g) was also further added, and the mixture was stirred for 30 minutes. Further produced solids not produced in dichloromethane and benzoyl chloride-trimethyamine salt were filtered and removed, and diethyl ether was distilled under reduced pressure and removed to obtain a liquid product.

Examples 7–12

Preparation of an Electrolyte

Each 0.1 wt % of the fluorine-based non-ionic surfactants prepared according to Examples 1 to 6 above was added to a 1M $LiPF_6$ solution with a composition of EC÷EMC=1÷1 using F-EC and F-EMC purchased from Mitsubishi Chem. Company in a globe box to prepare electrolytes.

Examples 13–18

Preparation of an Electrolyte

Except for changing the amount of the added fluorine-based non-ionic surfactants from 0.1 wt % to 0.01 wt %, electrolytes of Examples 13 –18 were prepared by the same method as in Examples 7–12.

Conparative Example 1

Preparation of an Electrolyte

A 1 molar (M) $LiPF_6$ electrolyte with a composition of EC÷EMC=1÷1 was prepared using F-EC and E-EMC purchased from Mitsubishi Chem. Company in a globe box.

Examples 19–30

Preparation of a Lithium Ion Battery

93% of a carbon active material (MCMB-10–28 from Osaka Gas) and 7% of a polyvinylidene difluoride (PVDF) (Kynar 761 product from Elf Atochem Company) were mixed in a mixer (Ika Company) for 2 hours using pyrrolidone (NMP) as a solvent. T the mixture was coated on copper foil collector and dried at 130° C. to prepare an anode. 91% of $LiCoO_2$, 3% of PVDF (Kynar 761) and 6% of conductive carbon (KS-6 from Lonza Company) were mixed in a mixer (Ika Company) for 2 hours using N-methyl-2-pyrrolidone (NMP), and the mixture was coated on an aluminum foil collector and dried at 130° C. to prepare a cathode. Celgard 2400 (from Hoechst Celanese Company)

was put between the prepared anode and cathode for use as a separator to fabricate a coin-type battery, and the electrolytes prepared in Examples 7–18 were respectively injected therein to prepare lithium ion batteries of Examples 19–30. The batteries were charged to 4.2 volts (V) and discharged to 3V to perform a charge/discharge test. The results of the test are summarized in Table 1.

Comparative Example 2

Preparation of a Lithium Ion Battery

Except for the injection of the electrolyte prepared in Comparative Example 1, a lithium ion battery was prepared by the same method as in Example 1. A charge/discharge test was performed by the same method as in Example 1, the results of which are presented in Table 1.

TABLE 1

| | Surfactant (wt %) | | Initial Capacity of Battery (milliAmp hour) | Initial Charge Efficiency |
|---|---|---|---|---|
| Comparative Example 2 | | | 3.75 | 87.62 |
| Example 19 | 142d-Ac | 0.1 | 3.81 | 89.81 |
| Example 20 | 144d-Ac | 0.1 | 3.80 | 89.38 |
| Example 21 | 142d-Me | 0.1 | 3.82 | 88.25 |
| Example 22 | 144d-Me | 0.1 | 3.84 | 88.96 |
| Example 23 | 142d-Bz | 0.1 | 3.83 | 88.75 |
| Example 24 | 144d-Bz | 0.1 | 3.82 | 88.75 |
| Example 25 | 142d-Ac | 0.01 | 3.80 | 88.97 |
| Example 26 | 144d-Ac | 0.01 | 3.78 | 89.62 |
| Example 27 | 142d-Me | 0.01 | 3.89 | 89.14 |
| Example 28 | 144d-Me | 0.01 | 3.78 | 86.61 |
| Example 29 | 142d-Bz | 0.01 | 3.72 | 87.35 |
| Example 30 | 144d-Bz | 0.01 | 3.79 | 88.59 |

Example 31

Impedance Properties

Figure 2:
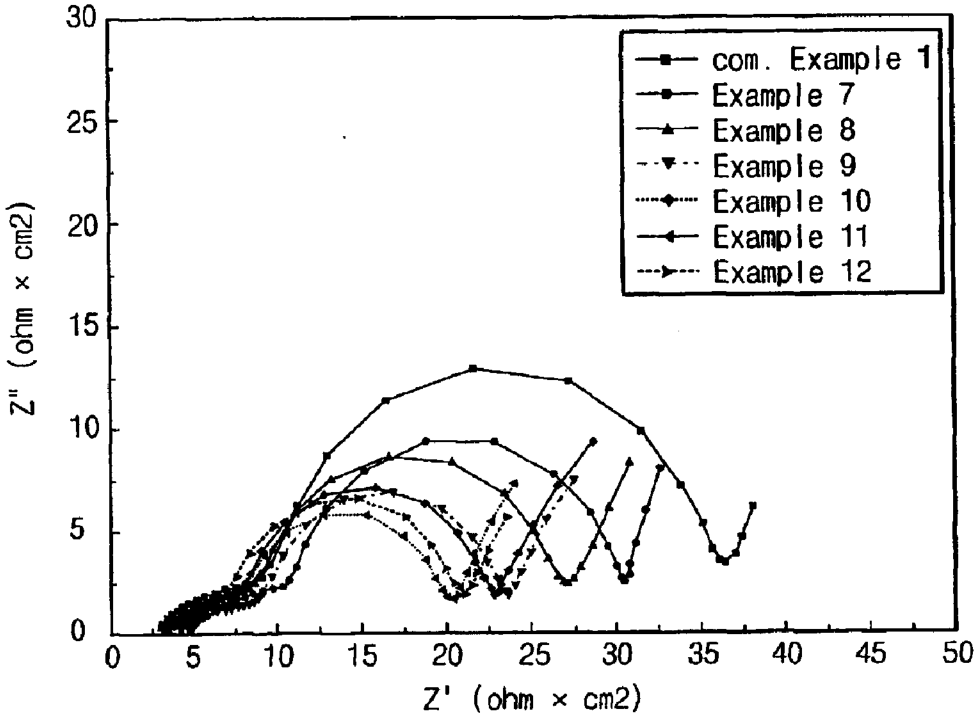
FIG. 2 is a graph comparing impedance properties of lithium ion batteries prepared according to Examples 25–30 and of batteries prepared according to Comparative Example 2.

The batteries prepared in Examples 19–30 and Comparative Example 2 were charged to 4.2 V and discharged to 3.0 V. The process was repeated, and the batteries were then charged again to 4.2 V and an impedance of the batteries was measured. The impedance was measured by scanning from 1 MHz to 1 mHz (millihertz) using a Potentiostat/Galvanostat, Model 273A from EG & G PRINCETON APPLIED RESEARCH Company and the SI 1260 Impedance/Gain-phase analyzer from Solatron Instruments Company. The results of the measurements are presented in FIGS. 1 and 2.

Example 32

Synthesis of a Fluorine-based Ethylene Oxide Resin Surfactant F-142P-Ac Substituted with Acetate at the End An acetate-substituted fluorine-based ethylene oxide resin surfactant having a higher purity than 142d-Ac was obtained using MEGAFAC F-142P (n=10) from DIANIPPON INK & CHEMICALS Company by the same method as in Example 1.

Example 33

Preparation of an Electrolyte 0.1 wt % of the surfactant synthesized in Preparation Example 32 was added to a 1M $LiPF_6$ solution with a composition of EC÷EMC=1:-1 using F-EC and F-EMC purchased from Mitsubishi Chem. Company in a globe box to prepare an electrolyte.

Example 34

Preparation of an Electrolyte 0.01 wt % of the surfactant synthesized in Preparation Example 32 was added to a 1M $LiPF_6$ solution with a composition of EC÷EMC=1:-1 using F-EC and F-EMC purchased from Mitsubishi Chem. Company in a globe box to prepare an electrolyte.

Examples 35 and 36

Preparation of a Lithium Ion Battery

Lithium ion batteries were prepared using the electrolytes of Examples 33 and 34, respectively, by the same method as in Example 19.

Example 37

Battery Performance Test

Figure 3:
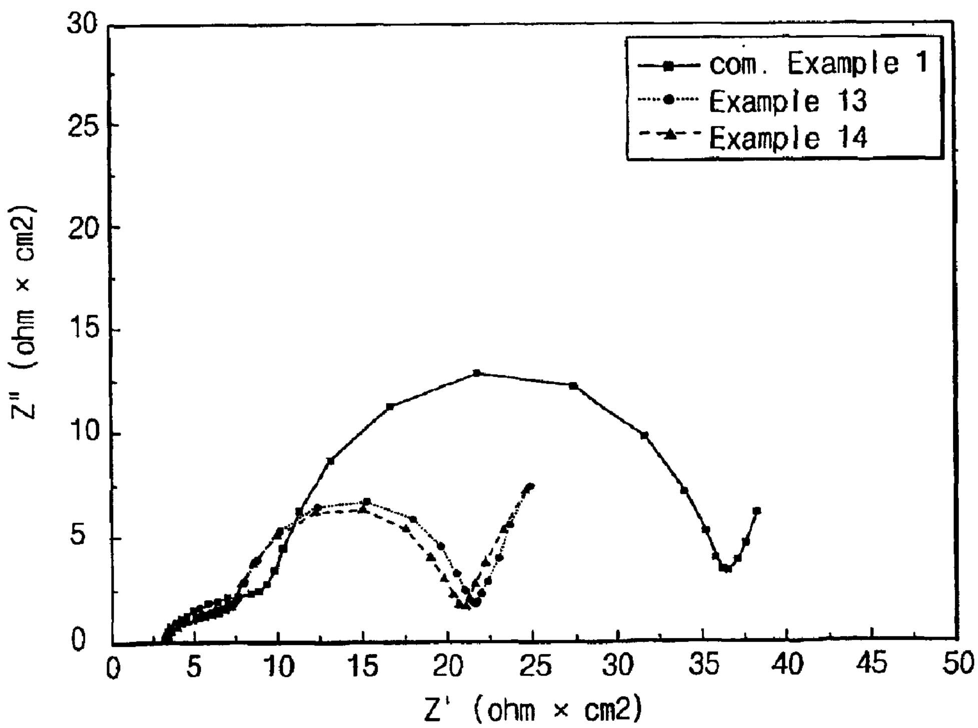
FIG. 3 is a graph comparing impedance properties of lithium ion batteries prepared according to Examples 35–36 and of batteries prepared according to Comparative Example 2.

An initial capacity, an initial charge efficiency, and impedance properties of the batteries prepared in Examples 35 and 36 were measured by the same method as in Examples 19–30. The results are presented in Table 2 and in FIG. 3

TABLE 2

| | Surfactant (wt %) | | Initial Battery Capacity (mAh) | Initial Charge Efficiency |
|---|---|---|---|---|
| Comparative Example 2 | — | — | 3.75 | 87.62 |
| Example 35 | 142P-Ac | 0.1 | 3.80 | 88.31 |
| Example 36 | 144P-Ac | 0.01 | 3.79 | 88.40 |

As explained above, the lithium ion battery prepared according to the present invention uses an electrolyte comprising a fluorine-based non-ionic surfactant substituted with various functional groups at the end as represented by Formula 1 above, improves the interfacial property between an electrolyte and electrodes, improves the impedance properties, and exhibits a high capacity and excellent charge/discharge properties.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within scope of the appended claims.

What is claimed is:

1. An electrolyte comprising a fluorine-based non-ionic surfactant represented by a formula:

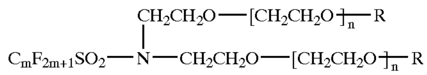

wherein, R is a hydrogen, an acetyl group, a methyl group, or a benzoyl group; and m and n are integers from 2 to 20.

2. A lithium ion battery comprising:

an anode active material;

a cathode active material;

a porous separator; and an electrolyte comprising:

a lithium salt;

an electrolyte compound; and a fluorine-based non-ionic surfactant represented by a Formula:

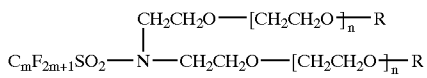

wherein, R is hydrogen, an acetyl group, a methyl group or a benzoyl group; and m and n are integers from 2 to 20.

3. The lithium ion battery according to claim 2, wherein the lithium-containing transition metal oxide is selected from the group consisting of $LiCoO_2$, $LiNiO_2$, $LiMn_2O_4$, and $LiNi_{1-x}Co_xO_2$, wherein x is between 0 and 1.

4. The lithium ion battery according to claim 2, wherein the lithium salt is selected from the group consisting of $LiClO_4$, $LiCF_3SO_3$, $LiPF_6$, $LiBF_4$, $LiAsF_6$ and $LiN(CF_3SO_2)_2$.

5. The lithium ion battery according to claim 2, wherein the electrolyte compound is at least one selected from the group consisting of ethylene carbonate, propylene carbonate, butylene carbonate, vinylene carbonate, diethyl carbonate, dimethyl carbonate, ethyl methyl carbonate, gamma-butyrolactone, sulfolane, methyl acetate, and methyl propionate.

6. The lithium ion battery according to claim 2, wherein the content of the fluorine-based non-ionic surfactant is 0.01 to 1 wt % of the electrolyte.

7. The lithium ion battery of claim 2, wherein the anode active material comprises a graphitized carbon.

8. The lithium ion battery of claim 2, wherein the graphitized carbon has an interplanar spacing of d002 of 0.338 nm or less, and a specific surface area of 10 $m^2/g$ or less.

9. The lithium ion battery of claim 2, wherein the cathode active material is a lithium-containing transition metal oxide.

* * * * *